Aug. 21, 1956    M. V. BRAUNAGEL    2,760,131
NONLINEAR GAIN SERVO SYSTEMS
Filed Aug. 11, 1953    2 Sheets-Sheet 1

INVENTOR.
MAGNUS V. BRAUNAGEL
BY
ATTYS.

Aug. 21, 1956   M. V. BRAUNAGEL   2,760,131
NONLINEAR GAIN SERVO SYSTEMS

Filed Aug. 11, 1953   2 Sheets-Sheet 2

INVENTOR.
MAGNUS V. BRAUNAGEL
BY
ATTYS.

United States Patent Office 2,760,131
Patented Aug. 21, 1956

2,760,131

NONLINEAR GAIN SERVO SYSTEMS

Magnus V. Braunagel, Indianapolis, Ind., assignor to United States of America as represented by the Secretary of the Navy Application August 11, 1953, Serial No. 373,695

8 Claims. (Cl. 318—28)

(Granted under Title 35, U. S. Code (1952), sec. 266)

The invention described herein may be manufactured and used by or for the Government of the United States of America for governmental purposes without the payment of any royalties thereon or therefor.

My invention relates to servo systems and is particularly directed to means for preventing hunting, oscillations, jerky movements, and other undesirable response characteristics of the power driven portion of the servo system.

The closed loop type of servo system comprises essentially an element to be moved, as a shaft to be turned, in response to the movement of a controlling element, sometimes remotely located. A motor supplies the power to move the controlled element and is actuated to drive the element in either direction in reponse to a so-called error signal. The error signal is usually a voltage obtained by comparing two voltages which are analogous, respectively, with the displaced positions of the controlling and controlled elements. In the ideal system, a command by the controlling element, whether it be large or small or fast or slow, is followed by a large amount of power delivered by the motor to drive the controlled element just the right distance to quickly reduce the error signal to zero. Unfortunately, the ideal is never realized in practice.

Even though electrical and/or mechanical damping may be added to the loop to reduce overshooting and oscillation of the motor about null, the motor torque must be sufficient to overcome the drag of the damping means and have finite excess torque to drive the controlled element toward zero. Hence, overshooting can result even with large amounts of damping.

Viscous friction, as distinguished from static or coulomb friction, increases with increased motor speed and, like the latter, it also is a disturbing factor and suggests the need for increased power to the system at the higher speeds.

In position servos, as distinguished from speed servos, there is still further predisposing factors at or near the null point where the error signal approaches zero. In computers or gun directors, for example, the null point must be precisely determined by the controlling element, deviations between controlled and controlling shafts often being required to be less than .5 degree at speeds of the order of 32 degrees per second in a speed range of .32 degree per second to 32 degrees per second. The principal part of the load on the motor of such systems usually consists of the drag of the wiper of a potentiometer. Although potentiometers are generally assumed to consist of pure coulomb friction that is invariant with speed the assumption is not strictly true at low speeds. The adjacent turns of the potentiometer resistive winding cause servo jumpiness at low speeds. Further, the gear train between the motor and the load aggravates the jumpy effects. A perfect gear train should possess no friction or backlash, but for a gear train to possess no friction it must possess some backlash in order to compensate for metal expansion, eccentricity of gears, et cetera. Hence, a gear train with backlash will tend to amplify the bad effects attributable to jumps of the contact wiper from turn to turn of the winding.

The potentiometers of the error data device usually have a finite number of turns of resistance wire, and at the low load speed of .32 degree per second, the wiper approaches the limit of moving from one turn to the next in one second. Every time the input or output potentiometer moves from turn to turn, the actual input of the servo system approaches that of a finite number of small step functions. The servo tends to follow such incremental step inputs with a jerky motion. At higher speeds, of course, the greater portion of such effects introduced by the data device, gear train, et cetera, are greatly reduced by the inertia of the moving parts. The problem encountered in the high speed region, however, is that the system has to have a tight enough loop gain so that it will remain within the allowable tolerance limits of, say, .5 degree at 32 degrees per second.

An object of my invention is to provide an improved servo system.

A more specific object of my invention is to provide an improved servo system which has fast response yet will not over-shoot nor oscillate about null.

Another and more specific object of my invention is to provide a servo system in which power delivered by the motor in the system is a function of speed of the motor and/or magnitude of the error signal Other objects will appear from the following description of preferred embodiments of my invention. The invention is defined with particularity in the appended claims and said embodiments are illustrated in the accompanying drawings in which:

I have found that the jerkiness at low speeds can be reduced if the gain or amplification factor of the amplifier which controls the motor is set so as to critically damp the servo system. With critical damping the system does not tend to overtravel its ultimate position, when disturbed. The viscous friction which is a function of speed on the other hand approaches zero at low speeds hence the amplifier gain can be reduced and still remain within the error tolerances. The operation near the upper speed limit requires that the amplifier gain be increased so as to counteract the added viscous friction drag introduced by the motor and the other moving components of the system.

Two specific values of amplifier gain may thus be assigned in any particular servo systems, according to my invention. The amplifier gain and actual motor torque at low speeds is calculated for the friction load, resulting in the critical damping value of the system. Then the gain and torque is calculated for the highest speed, these values being greater than the low speed values by the amount required by the viscous friction load. Since the two calculated amplifier gain values are functions of speed, the amplifier gain should be controlled in operation by speed. Since speed in turn is a function of error, the gain of any amplifier, which controls the current to the servo motor, may be varied in response to either the speed of the servo motor, or the error signal of the servo system.

Figure 1:
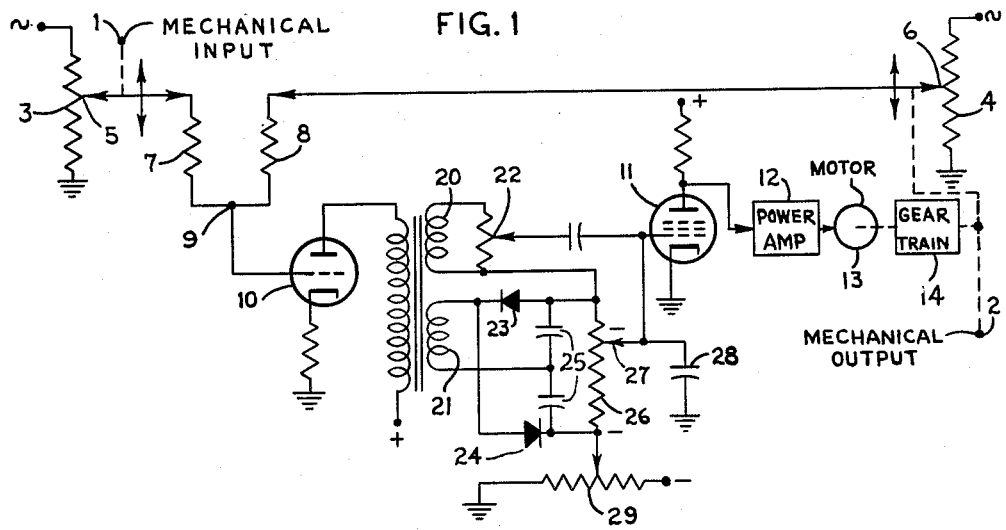
Fig. 1 is a circuit diagram of a servo loop embodying my invention.

The principal elements of the closed loop servo system of Fig. 1 comprise an input or controlling element 1, the displacement of which either linearly or rotationally must be followed by a corresponding displacement at the mechanical output 2 of the system. The mechanical input and output are solidly linked, respectively, with position indicating devices which, in the embodiment shown, comprise potentiometers 3 and 4 and their contact wipers 5 and 6. The positions of the wipers 5 and 6 are conveniently compared by comparing the potentials of the wipers which are, respectively, determined by the positions of the wipers intermediate the ends of the potentiometer resistance. If steady voltages, either A. C. or D. C., are applied across the ends of the potentiometers, voltages at the wipers may be calibrated in terms of positions of the wipers. Ground or other reference potential may be connected to either end or to an intermediate point of the potentiometer. The wiper voltages are applied, respectively, to the ends of like resistors 7 and 8 so that when the wiper voltages are equal, the junction 9 of the resistors is at zero or null. The sign of the potential at point 9 indicates the lag or lead position of the control element with respect to the controlling element, and the magnitude of the voltage of point 9 indicates the magnitude of the difference in the two positions. The voltage at point 9 is called the error signal. The error signal is amplified if desired as in triode 10 and is then applied, through the variable gain amplifier 11, to be described, to the power controller or power amplifier 12. The power amplifier regulates the current flow to the motor 13, the output shaft of which is coupled to the output of the system through gear train 14. Power is introduced to the system sufficient to overcome the losses in the loop and to drive the motor and its mechanical load. The amplifier tubes may either supply the necessary current for the motor or may control electromagnetic or electronic relays which in the usual fashion control the primary power to the motor. Where alternating current is employed to energize the potentiometers 3 and 4, and the error signal circuitry of the servo loop, the motor 13 should be of the phase sensitive type, such as a two-phase motor, with one phase winding paralleled with the energizing A. C. of the loop and the other phase winding connected to the output of amplifier 12. The motor will then sense the phase of the error signal.

According to an important and characteristic feature of my invention, changes in the level of power supplied to the motor per unit of change of error signal becomes a function of the magnitude of the error signal. Alternatively, and according to a further feature of my invention the changes in power supplied to the motor may be made a function of the speed of the motor.

Advantage has been taken in my invention of the exponential input-output characteristic of a conventional grid-control electron discharge device. In the well known remote cut-off type of amplifier, for example, the amplification factor varies widely throughout the normal range of grid biases. The curve of Fig. 2, which approximates the characteristic of the commercial 6SK7 with a 250 volt plate and 100 volt screen grid, indicates that the slope of the curve varies from near the vertical to near the horizontal as the grid bias increases from 0 to —30 volts. For example, a 10 volt grid variation in the —10 to —20 range produces about one milliampere change in plate current, whereas a 5 volt change in the —5 to —10 range produces a four milliampere plate current change. Of course, the minimum plate current that may be fed to the motor of the system must be in excess of the power required to overcome the losses of the loop.

The motor control circuitry of Fig. 1 for supplying power to the motor, the amount of power of which varies exponentially with the error signal, comprises the variable gain amplifier 11. The error signal, first applied to a linear amplifier 10, is inductively fed to two secondary windings 20 and 21. The raw unaltered error signal is applied by winding 20 directly to the control grid of the variable gain amplifier, potentiometer 22 being inserted as shown for front-panel control of the signal voltage at the control grid. The position-determining potentiometers are energized with alternating current in Fig. 1, although direct current energization and direct current error signals could be employed, requiring only that direct current amplifiers and couplings be used, with provisions throughout the error signal channel for polarity sensing.

The second winding 21 is coupled through a half or full wave rectifier to the control grid of tube 11 in such a manner that the bias of the grid is proportional to the average amplitude of the error signal. The time constant of the capacity-resistance network should be commensurate with the overall time constant of the loop, which of course will be high compared to the time constant of the signal channel 10—20—22 to the grid. In the specific embodiment shown, the error signal in winding 21 is rectified by the full wave rectifier comprising diodes 23 and 24, smoothing condensers 25 and resistor 26. The potential across resistor 26, hence, is proportional to the average error signal. The arrowheads of diodes 23 and 24 point in the direction of electron flow. Hence, in the circuit loop comprised of rectifiers 23—24 and potentiometer resistor 26, electrons may be considered to flow in the counterclockwise direction. Because the resistance through potentiometer 29 to ground is less than the resistance of potentiometer resistor 26, electrons will be withdrawn more rapidly from the upper end of potentiometer 26 than will be replenished from the lower end through potentiometer resistor 26. Accordingly, an error signal of increasing amplitude will make the potential on the control grid of amplifier 11 less negative.

It should be observed, of course, that a reversal in the direction of bias potential change with increasing amplitudes of error signal may be produced on the grid of nonlinear amplifier 11 merely by reversing the electrical connections of each of the diodes 23 and 24. Whether the bias potential on the control grid of tube 11 should be made to become more or less negative with increasing error signal amplitudes will depend only upon the operational characteristics of the particular power amplifier 12 chosen for use in the system. Usually, it is desirable to increase motor power and speed as the magnitude of error becomes greater. Therefore, if it is assumed, as is the case of Figure 1, that the power amplifier 12 is such that increased power output is produced as the positive D.-C. potential on the plate of amplifier 11 becomes less positive, then the orientation of diodes 23 and 24 should be as shown; an increasing error signal will make the control grid of the amplifier 11 less negative, thereby increasing plate current flow and reducing the positive D.-C. potential at the plate of amplifier 11.

The desired portion of the rectified error signal to bias the control grid of variable gain amplifier 11 is determined by the adjustable contact 27 which is coupled directly to the control grid. A by-pass condenser 28 is desirable at this point. In series with the variable grid bias is connected the adjustable steady bias of potentiometer 29.

The polarity and magnitude of the two biasing sources, 26 and 29, are such that an increase in voltage across potentiometer 26 reduces the negative bias at the control grid. Where the variable gain amplifier 11 is of the commercial 6SK7 type, the anode potential should be about 250 volts, the screen grid potential about 100 volts and the control grid voltage variable from zero to —30 or —40 volts. The output of the variable gain amplifier 11 may be resistance coupled to the power amplifier 12, the response of which should be approximately linear. The parameters of the motor 13 are of course adapted to the output circuitry of the power amplifier 12, and the shaft output of the motor, through gear train 14, is coupled to the wiper 6 of the position potentiometer and to the mechanical output 2 of the system. It follows that the electrical power supplied to the motor and mechanical power delivered by the motor is a function of the error, or difference between the positions of wipers 5 and 6. When the error signal is large the control grid bias at amplifier 11 is small and the output power is high. When, however, the error signal is small and the control grid bias is high the output current of the amplifier is low and the motor power is low.

Figure 2:
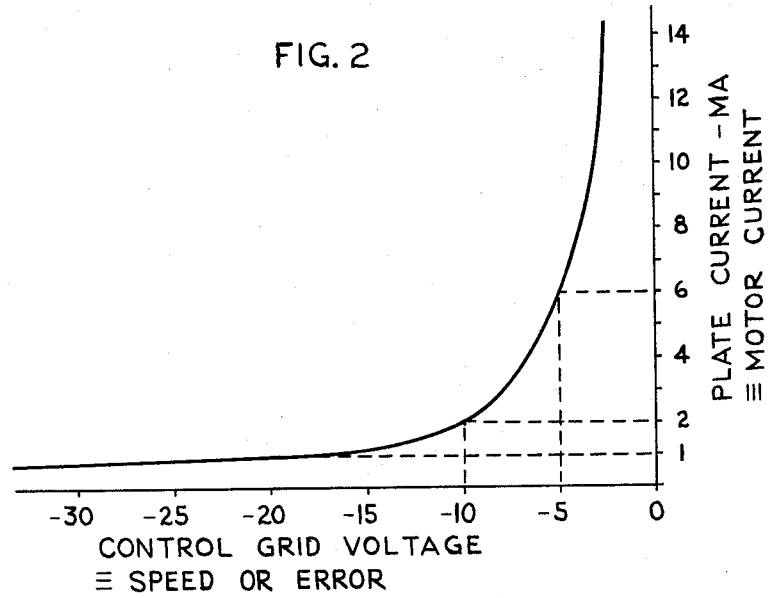
Fig. 2 shows the grid voltage plate current characteristic of the control tube of my invention.
Figure 3:
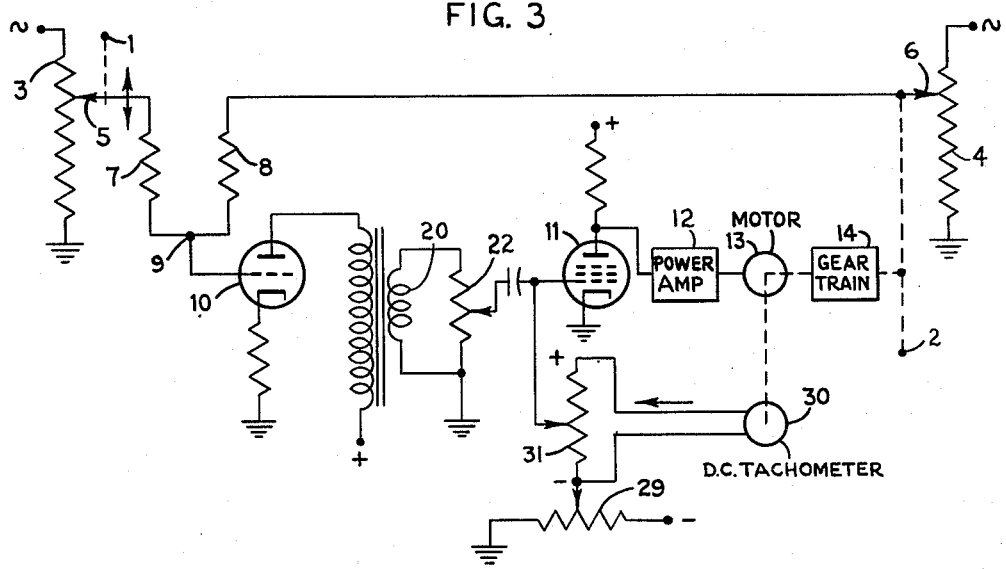
Fig. 3 is another circuit diagram of a closed loop servo embodying my invention.

According to the embodiment of my invention shown in Fig. 3, the motor power may be made a function of motor speed instead of error magnitude as in Fig. 1. The tachometer 30, the output voltage of which is proportional to the tachometer speed, is mechanically coupled directly to the motor 13. The electrical terminals of the tachometer are connected to the control grid of the variable gain amplifier 11. Here, as in Fig. 1, the variable biasing voltage is polarized and serially added to the fixed bias of the potentiometer 29 so as to decrease the negative bias on the control grid as the voltage across potentiometer 31 increases. The error signal from junction 9 is also applied through blocking condensers to the control grid as in Fig. 1 and the load circuit of the amplifier 11 is coupled to the power amplifier 12 which in turn is coupled to the electrical input of the motor. Hence, the power input to the servo system of Fig. 3 becomes a function of motor speed, the exponential relationship of speed and power being that of the characteristic of Fig. 2.

Figure 4:
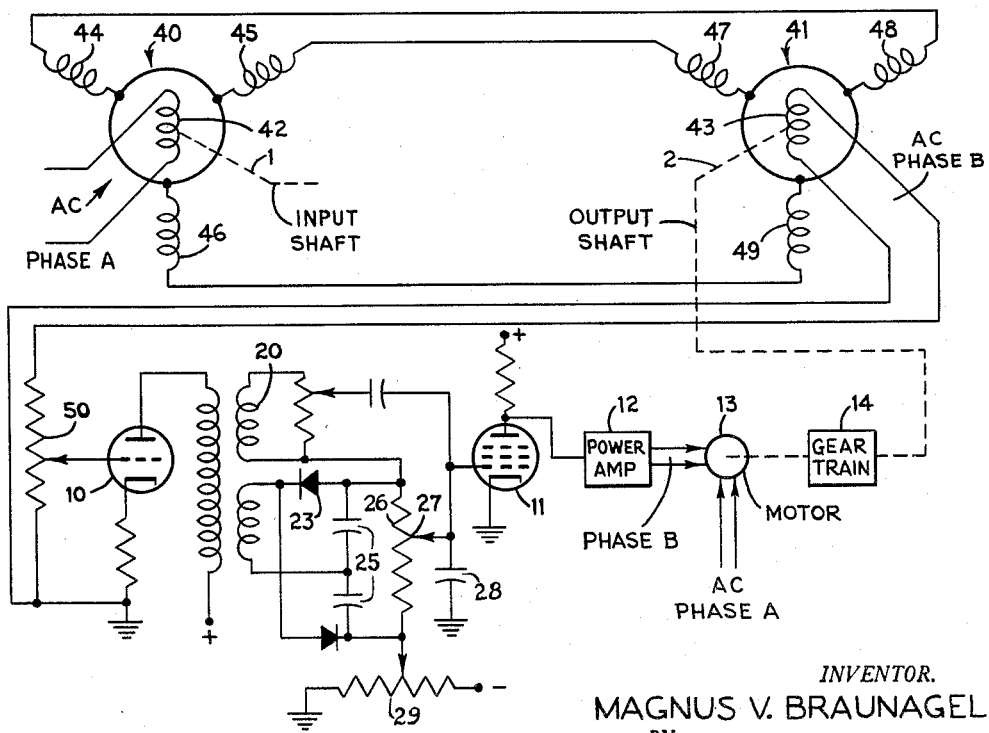
Figure 4 is a circuit diagram of a servo loop embodying the invention of Figure 1 and particularly applicable to a synchro system.

The principle of feeding back error signals in a servo loop through a variable gain amplifier, the gain of which is a function of error amplitude, is admirably adapted to so called synchro systems. Such a system comprises two rotary inductor machines similar to induction regulators having their movable elements, for example—rotors, keyed to the input and output shafts of the system. The input machine is here called a synchro transmitter and the output machine is called a synchro motor. In Fig. 4 the synchro transmitter 40 and synchro motor 41 each comprise a rotor 42 and 43 with a single winding. The three stator windings 44, 45 and 46 in the transmitter and the three stator windings 47, 48 and 49 in the motor are Y-connected and the windings are paired in parallel. The windings are spaced uniformly 120 degrees apart about the stator frames of the transmitter and motor. For a magnetic field having resultant orientation in one machine there is produced a corresponding magnetic field with the same orientation in the other machine. Alternating current of a phase which may be designated phase A, is applied to rotor winding 42. It follows that if the input shaft 1, mechanically coupled to the transmitter rotor, is displaced θ degrees, the rotor winding 43 of the motor and its connected output shaft 2 will have a corresponding displacement of θ degrees. Also, any differential of displacement of shafts 1 and 2 will produce an alternating current across winding 43 having a magnitude which is proportional to the differential. Still further, the lagging or leading phase relationships of the alternating current of one rotor with respect to the other will depend upon whether the motor winding stands in a clockwise or counter-clockwise position with respect to the generator winding. The phase of the current through winding 43 may be designated phase B.

Now, by coupling the motor rotor winding 43 to an amplifier system analogous to those shown in Fig. 1 or 2, the power motor 13 of the system may be made to drive the motor rotor to the null position determined by the transmitter rotor. In Fig. 4 motor winding 43 is coupled through volume control potentiometer 50 to the input of amplifier 10. The output of amplifier 10 is applied, through winding 20, directly to the control grid of the variable gain amplifier 11. The error signal at the output of amplifier 10 is also rectified and averaged, as in Figs. 1 and 2, and applied to the control grid of tube 11. As indicated above, the gain of amplifier 11 may vary from a high value in response to a low grid bias and a large error signal on the one hand to a low gain in response to a high grid bias and a small error on the other hand.

The output of amplifier 11 and the output of the coupled power amplifier 12 comprises an alternating current of the same phase as the phase B of the motor rotor 43. When phase B is applied to one of the two-phase windings of the phase sensitive motor 13, and compared to other phase, designated phase A, the motor will rotate in the proper direction to drive the output shaft 2, through gear train 14, to the zero or null position.

Many modifications may be made in the servo systems described without departing from the scope of my invention. My invention is defined in the appended claims.

I claim:

1. In combination in a servo system, a controlling shaft, a controlled shaft, an error voltage detecting device responsive to said shafts for deriving a voltage signal proportional to the differential placement of said shafts, a motor responsive to said signal coupled to said controlled shaft to drive said controlled shaft to a null position determined by said controlling shaft, an amplifier with a gain responsive to a control grid bias, said amplifier being coupled directly between said error detecting device and said motor to drive said motor in response to said signal; and means to vary said control grid bias, said means comprising a signal integrator coupled between the error detecting device and said amplifier to vary the grid bias in response to changes in magnitude of said signal.

2. A control system comprising a first voltage source responsive to a controlling quantity, a second voltage source responsive to a quantity to be controlled, means comparing the two voltages and deriving an error voltage proportional to the difference between said two quantities, a motor, said motor being mechanically coupled to the thing to be controlled, a power source, a power controlling amplifier, said amplifier being controllable in gain, said power source being coupled to said motor through said amplifier, and means coupled between the error voltage source and amplifier responsive to the magnitude of said error voltage for varying said gain.

3. A servo control system comprising an input controlling means, an output controlled means, a differential error detecting device, said device being coupled to both said means for comparing the magnitude of certain instantaneous controllable physical quantities of said means and for producing an error signal; a motor, a power source for said motor, an amplifier having a control circuit and a variable impedance secondary circuit, the impedance of the secondary circuit being nonlinearly responsive to a bias voltage on said control circuit, said motor being coupled to said power source through said secondary circuit and the error signal of said detecting device being applied to the control circuit of said amplifier, and separate means coupled between said detecting devices and said amplifier for controlling said bias voltage in response to changes in magnitude of said error signal.

4. In combination in a servo system, an input shaft, an output shaft, a motor for driving the output shaft, an error detecting device responsive to said shafts for producing a signal which is a function of the positional relationship of said shafts, a variable gain amplifier, said amplifier being coupled directly between said error detecting device and said motor, the connection between the amplifier and said device including a circuit of impedance low to the error signal, and means coupled between the error detecting device and the amplifier and responsive to the magnitude of said signal for varying the gain of said amplifier, and for nonlinearly increasing the motor power as the average error signal level increases.

5. In combination in a motor follow-up system, an output shaft, a motor connected to drive said shaft, an alternating current amplifier, said amplifier having a nonlinear grid voltage-plate current characteristic over an extended grid bias range; an input shaft, a differential means responsive to said shafts positional relationship producing an error signal, means to relay said error signal through said amplifier to said motor, and separate means coupled between said differential means and said amplifier and responsive to said error signal for changing said grid bias.

6. In combination in a servo system, an error signal source, a motor, an amplifier, said amplifier being coupled to said motor, a low time constant circuit and a high time constant circuit coupled in parallel between said source and the input to said amplifier.

7. In combination in a servo system, an alternating current error signal source, a motor, a grid-controlled amplifier, the output circuit of the amplifier being coupled to said motor, means to couple the input circuit of said amplifier to said error signal source; a rectifier with a smoothing circuit coupled between said source and the grid circuit of said amplifier to vary the amplification factor of said amplifier.

8. In combination in a servo system, a controlling shaft and a controlled shaft, two voltage sources responsive in amplitude, respectively, to the placements of the two shafts, means for algebraically adding the voltages of the two sources for producing an error voltage; a grid-controlled amplifier having a variable gain characteristic, two parallel coupling circuits directly between the adding means and the grid of said amplifier, one coupling circuit being adapted to apply to the grid of the amplifier a substantially undistorted sample of the error signal, and the other coupling circuit containing a rectifier and integrating means for biasing the grid of the amplifier in accordance with the average amplitude of the error signal; a motor driving said controlled shaft, and means responsive to the amplified signal at the output of said amplifier controlling the speed of said motor.

References Cited in the file of this patent
UNITED STATES PATENTS

| | | |
|---|---|---|
| 2,593,950 | Williams | Apr. 22, 1952 |
| 2,654,999 | Berge | Oct. 13, 1953 |
| 2,656,498 | Goodwin | Oct. 20, 1953 |
| 2,656,499 | Goodwin | Oct. 20, 1953 |
| 2,668,264 | Williams | Feb. 2, 1954 |
| 2,674,708 | Husted | Apr. 6, 1954 |